US007813931B2

(12) United States Patent
Hetherington et al.

(10) Patent No.: US 7,813,931 B2

(45) Date of Patent: Oct. 12, 2010

(54) SYSTEM FOR IMPROVING SPEECH QUALITY AND INTELLIGIBILITY WITH BANDWIDTH COMPRESSION/EXPANSION

(75) Inventors: Phillip Hetherington, Port Moody (CA); Xueman Li, Burnaby (CA)

(73) Assignee: QNX Software Systems, Co., Ottawa (CA)

( * ) Notice: Subject to any disclaimer, the term of this patent is extended or adjusted under 35 U.S.C. 154(b) by 1228 days.

(21) Appl. No.: 11/110,556

(22) Filed: Apr. 20, 2005

(65) Prior Publication Data

US 2006/0247922 A1 Nov. 2, 2006

(51) Int. Cl.
*G01L 19/00* (2006.01)
*G01L 19/14* (2006.01)

(52) U.S. Cl. ....................................... 704/500; 704/205

(58) Field of Classification Search ................. 704/201, 704/205, 500–501; 381/316
See application file for complete search history.

(56) References Cited

U.S. PATENT DOCUMENTS 4,130,734 A 12/1978 Lee
4,170,719 A * 10/1979 Fujimura .................... 704/208
4,255,620 A 3/1981 Harris et al.
4,343,005 A 8/1982 Han et al.

(Continued)

FOREIGN PATENT DOCUMENTS

EP 0 054 450 A1 6/1982
EP 0 497 050 A3 8/1992
EP 0 706 299 A3 10/1998
GB 1 424 133 2/1976

(Continued)

OTHER PUBLICATIONS

"A Closer Look into an MPEA-4 Efficiency AAC" Convention Paper by Martin Wolters, Kristoger Kjörling, Daniel Homm, and Heiko Purnhagen, Audio Engineering Society, Presented at the 115$^{th}$ Convention, Oct. 10-13, 2003, New York, NY, USA (16 Pages).

(Continued)

*Primary Examiner*—James S Wozniak
(74) *Attorney, Agent, or Firm*—Brinks Hofer Gilson & Lione

(57) ABSTRACT

A system and method are provided for improving the quality and intelligibility of speech signals. The system and method apply frequency compression to the higher frequency components of speech signals while leaving lower frequency components substantially unchanged. This preserves higher frequency information related to consonants which is typically lost to filtering and bandpass constraints. This information is preserved without significantly altering the fundamental pitch of the speech signal so that when the speech signal is reproduced its overall tone qualities are preserved. The system and method further apply frequency expansion to speech signals. Like the compression, only the upper frequencies of a received speech signal are expanded. When the frequency expansion is applied to a speech signal that has been compressed according to the invention, the speech signal is substantially returned to its pre-compressed state. However, frequency compression according to the invention provides improved intelligibility even when the speech signal is not subsequently re-expanded. Likewise, speech signals may be expanded even though the original signal was not compressed, without significant degradation of the speech signal quality. Thus, a transmitter may include the system for applying high frequency compression without regard to whether a receiver will be capable of re-expanding the signal. Likewise, a receiver may expand a received speech signal without regard to whether the signal was previously compressed.

13 Claims, 13 Drawing Sheets

U.S. PATENT DOCUMENTS

| | | | | |
|---|---|---|---|---|
| 4,374,304 | A | 2/1983 | Flanagan | |
| 4,600,902 | A * | 7/1986 | Lafferty | 333/14 |
| 4,700,360 | A | 10/1987 | Visser | |
| 4,741,039 | A | 4/1988 | Bloy | |
| 4,953,182 | A | 8/1990 | Chung | |
| 5,335,069 | A | 8/1994 | Kim | |
| 5,345,200 | A | 9/1994 | Reif | |
| 5,396,414 | A | 3/1995 | Alcone | |
| 5,416,787 | A | 5/1995 | Kodama et al. | |
| 5,455,888 | A | 10/1995 | Iyengar et al. | |
| 5,497,090 | A | 3/1996 | Macovski | |
| 5,581,652 | A | 12/1996 | Abe et al. | |
| 5,771,299 | A | 6/1998 | Melanson | |
| 5,774,841 | A | 6/1998 | Salazar et al. | |
| 5,790,671 | A | 8/1998 | Cooper | |
| 5,822,370 | A * | 10/1998 | Graupe | 375/240 |
| 5,867,815 | A * | 2/1999 | Kondo et al. | 704/228 |
| 5,950,153 | A | 9/1999 | Ohmori et al. | |
| 5,999,899 | A | 12/1999 | Robinson | |
| 6,115,363 | A | 9/2000 | Oberhammer et al. | |
| 6,144,244 | A | 11/2000 | Gilbert | |
| 6,154,643 | A | 11/2000 | Cox | |
| 6,157,682 | A | 12/2000 | Oberhammer | |
| 6,195,394 | B1 | 2/2001 | Arbeiter et al. | |
| 6,208,958 | B1 | 3/2001 | Cho et al. | |
| 6,226,616 | B1 | 5/2001 | You et al. | |
| 6,275,596 | B1 | 8/2001 | Fretz et al. | |
| 6,295,322 | B1 | 9/2001 | Arbeiter et al. | |
| 6,311,153 | B1 * | 10/2001 | Nakatoh et al. | 704/216 |
| 6,504,935 | B1 | 1/2003 | Jackson | |
| 6,539,355 | B1 * | 3/2003 | Omori et al. | 704/268 |
| 6,577,739 | B1 | 6/2003 | Hurtig et al. | |
| 6,615,169 | B1 | 9/2003 | Ojala et al. | |
| 6,675,144 | B1 | 1/2004 | Tucker et al. | |
| 6,680,972 | B1 * | 1/2004 | Liljeryd et al. | 375/240 |
| 6,681,202 | B1 | 1/2004 | Miet et al. | |
| 6,691,083 | B1 | 2/2004 | Breen | |
| 6,691,085 | B1 | 2/2004 | Rotola-Pukkila et al. | |
| 6,704,711 | B2 | 3/2004 | Gustafsson et al. | |
| 6,721,698 | B1 * | 4/2004 | Hariharan et al. | 704/203 |
| 6,741,966 | B2 * | 5/2004 | Romesburg | 704/500 |
| 6,766,292 | B1 | 7/2004 | Chandran et al. | |
| 6,778,966 | B2 | 8/2004 | Bizjak | |
| 6,819,275 | B2 | 11/2004 | Reefman et al. | |
| 6,895,375 | B2 | 5/2005 | Malah et al. | |
| 7,069,212 | B2 | 6/2006 | Tanaka et al. | |
| 7,139,702 | B2 | 11/2006 | Tsushima et al. | |
| 7,248,711 | B2 * | 7/2007 | Allegro et al. | 381/316 |
| 7,283,967 | B2 | 10/2007 | Nishio et al. | |
| 7,333,618 | B2 | 2/2008 | Shuttleworth et al. | |
| 7,333,930 | B2 * | 2/2008 | Baumgarte | 704/200.1 |
| 2002/0107593 | A1 | 8/2002 | Rabipour et al. | |
| 2002/0111796 | A1 | 8/2002 | Nemoto | |
| 2002/0128839 | A1 | 9/2002 | Lindgren et al. | |
| 2002/0138268 | A1 | 9/2002 | Gustafsson | |
| 2003/0009327 | A1 | 1/2003 | Nilsson et al. | |
| 2003/0050786 | A1 | 3/2003 | Jax et al. | |
| 2003/0093278 | A1 | 5/2003 | Malah | |
| 2003/0093279 | A1 | 5/2003 | Malah et al. | |
| 2003/0158726 | A1 | 8/2003 | Philippe et al. | |
| 2004/0158458 | A1 | 8/2004 | Sluijter et al. | |
| 2004/0166820 | A1 | 8/2004 | Sluijter et al. | |
| 2004/0174911 | A1 | 9/2004 | Kim et al. | |
| 2004/0175010 | A1 | 9/2004 | Allegro et al. | |
| 2004/0190734 | A1 * | 9/2004 | Kates | 381/106 |
| 2004/0264721 | A1 | 12/2004 | Allegro et al. | |
| 2005/0175194 | A1 * | 8/2005 | Anderson | 381/106 |
| 2005/0261893 | A1 * | 11/2005 | Toyama et al. | 704/201 |

FOREIGN PATENT DOCUMENTS

| | | |
|---|---|---|
| KR | 2002-0066921 | 8/2002 |
| WO | WO 98/06090 A1 | 2/1998 |
| WO | WO 99/14986 | 3/1999 |
| WO | WO 01/18960 A1 | 3/2001 |
| WO | WO 2005015952 A1 | 2/2005 |

OTHER PUBLICATIONS

"Neural Networks Versus Codebooks in an Application for Bandwidth Extension of Speech Signals" by Bernd Iser, Gerhard Schmidt, Temic Speech Dialog Systems, Soeflinger Str. 100, 89077 Ulm, Germany, Proceedings of Eurospeech 2003 (4 Pages).

Patrick, P.J. et al., "Frequency Compression of 7.6 kHz Speech into 3.3 kHz Bandwidth," *IEEE Trans. Commun.*, vol. COM-31, No. 5, May 1983, pp. 692-701.

Notice Requesting Submission of Opinion dated May 25, 2009, for Application No. KR-10-2007-7023430.

Notice Requesting Submission of Opinion dated Dec. 18, 2007, for Application No. KR-10-2006-0119849.

European Search Report, dated Feb. 27, 2007, Annex, and Written Opinion of European Application No. 06 02 4650.

* cited by examiner

• System diagrams

SYSTEM FOR IMPROVING SPEECH QUALITY AND INTELLIGIBILITY WITH BANDWIDTH COMPRESSION/EXPANSION

BACKGROUND OF THE INVENTION

The present invention relates to methods and systems for improving the quality and intelligibility of speech signals in communications systems. All communications systems, especially wireless communications systems, suffer bandwidth limitations. The quality and intelligibility of speech signals transmitted in such systems must be balanced against the limited bandwidth available to the system. In wireless telephone networks, for example, the bandwidth is typically set according to the minimum bandwidth necessary for successful communication. The lowest frequency important to understanding a vowel is about 200 Hz and the highest frequency vowel formant is about 3000 Hz. Most consonants however are broadband, usually having energy in frequencies below about 3400 Hz. Accordingly, most wireless speech communication systems, are optimized to pass between 300 and 3400 Hz.

A typical passband 10 for a speech communication system is shown in FIG. 1. In general, passband 10 is adequate for delivering speech signals that are both intelligible and are a reasonable facsimile of a person's speaking voice. Nonetheless, much speech information contained in higher frequencies outside the passband 10, mainly that related to the sounding of consonants, is lost due to bandpass filtering. This can have a detrimental impact on intelligibility in environments where a significant amount of noise is present.

The passband standards that gave rise to the typical passband 10 shown in FIG. 1 are based on near field measurements where the microphone picking up a speaker's voice is located within 10 cm of the speaker's mouth. In such cases the signal-to-noise ratio is high and sufficient high frequency information is retained to make most consonants intelligible. In far field arrangements, such as hands-free telephone systems, the microphone is located 20 cm or more from the speaker's mouth. Under these conditions the signal-to-noise ratio is much lower than when using a traditional handset. The noise problem is exacerbated by road, wind and engine noise when a hands-free telephone is employed in a moving automobile. In fact, the noise level in a car with a hands-free telephone can be so high that many broadband low energy consonants are completely masked.

As an example, FIG. 2 shows two spectrographs of the spoken word "seven". The first spectrograph 12 is taken under quiet near field conditions. The second is taken under the noisy, far field condition, typical of a hands-free phone in a moving automobile. Referring first to the "quiet" seven 12, we can see evidence of each of the sounds that make up the spoken word seven. First we see the sound of the "S" 16. This is a broadband sound having most of its energy in the higher frequencies. We see the first and second Es and all their harmonics 18, 22, and the broadband sound of the "V" 20 sandwiched therebetween. The sound of the "N" at the end of the word is merged with the second E22 until the tongue is released from the roof of the mouth, giving rise to the short broadband energies 24 at the end of the word.

The ability to hear consonants is the single most important factor governing the intelligibility of speech signals. Comparing the "quiet" seven 12 to the "noisy" seven 14, we see that the "S" sound 16 is completely masked in the second spectrograph 14. The only sounds that can be seen with any clarity in the spectrograph 14 of the "noisy" seven are the sounds of the first and second Es, 18, 22. Thus, under the noisy conditions, the intelligibility of the spoken word "seven" is significantly reduced. If the noise energy is significantly higher than the consonants' energies (e.g. 3 dB), no amount of noise removal or filtering within the passband will improve intelligibility.

Car noise tends to fall off with frequency. Many consonants, on the other hand, (e.g., F, T, S) tend to possess significant energy at much higher frequencies. For example, often the only information in a speech signal above 10 KHz, is related to consonants. FIG. 3 repeats the spectrograph of the word "seven" recorded in a noisy environment, but extended over a wider frequency range. The sound of the "S" 16 is clearly visible, even in the presence of a significant amount of noise, but only at frequencies above about 6000 Hz. Since cell phone passbands exclude frequencies greater than 3400 Hz, this high frequency information is lost in traditional cell phone communications. Due to the high demand for bandwidth capacity, expanding the passband to preserve this high frequency information is not a practical solution for improving the intelligibility of speech communications.

Attempts have been made to compress speech signals so that their entire spectrum (or at least a significant portion of the high frequency content that is normally lost) falls within the passband. FIG. 4 shows a 5500 Hz speech signal 26 that is to be compressed in this manner. Signal 28 in FIG. 5 is the 5500 Hz signal 26 of FIG. 4 linearly compressed into the narrower 3000 Hz range. Although the compressed signal 28 only extends to 3000 Hz, all of the high frequency content of the original signal 26 contained in the frequency range from 3000 to 5500 is preserved in the compressed signal 28 but at the cost of significantly altering the fundamental pitch and tonal qualities of the original signal. All frequencies of the original signal 26, including the lower frequencies relating to vowels, which control pitch, are compressed into lower frequency ranges. If the compressed signal 28 is reproduced without subsequent re-expansion, the speech will have an unnaturally low pitch that is unacceptable for speech communication. Expanding the compressed signal at the receiver will solve this problem, but this requires knowledge at the receiver of the compression applied by the transmitter. Such a solution is not practical for most telephone applications, where there are no provisions for sending coding information along with the speech signal.

In order to preserve higher frequency speech information an encoding system or compression technique for telephone or other open network applications where speech signal transmitters and receivers have no knowledge of the capabilities of their opposite members must be sufficiently flexible such that the quality of the speech signal reproduced at the receiver is acceptable regardless of whether a compressed signal is re-expanded at the receiver, or whether a non-compressed signal is subsequently expanded. According to an improved encoding system or technique a transmitter may encode a speech signal without regard to whether the receiver at the opposite end of the communication has the capability of decoding the signal. Similarly, a receiver may decode a received signal without regard to whether the signal was first encoded at the transmitter. In other words, an improved encoding system or compression technique should compress speech signals in a manner such that the quality of the reproduced speech signal is satisfactory even if the signal is reproduced without re-expansion at the receiver. The speech quality will also be satisfactory in cases where a receiver expands a speech signal even though the received signal was not first encoded by the transmitter. Further, such an improved system should show marked improvement in the intelligibility of transmitted speech signals when the transmitted voice signal is compressed according to the improved technique at the transmitter.

SUMMARY OF THE INVENTION

This invention relates to a system and method for improving speech intelligibility in transmitted speech signals. The invention increases the probability that speech will be accurately recognized and interpreted by preserving high frequency information that is typically discarded or otherwise lost in most conventional communications systems. The invention does so without fundamentally altering the pitch and other tonal sound qualities of the affected speech signal.

The invention uses a form of frequency compression to move higher frequency information to lower frequencies that are within a communication system's passband. As a result, higher frequency information which is typically related to enunciated consonants is not lost to filtering or other factors limiting the bandwidth of the system.

The invention employs a two stage approach. Lower frequency components of a speech signal, such as those associated with vowel sounds, are left unchanged. This substantially preserves the overall tone quality and pitch of the original speech signal. If the compressed speech signal is reproduced without subsequent re-expansion, the signal will sound reasonably similar to a reproduced speech signal without compression. A portion of the passband, however is reserved for compressed higher frequency information. The higher frequency components of the speech signal, those which are normally associated with consonants, and which are typically lost to filtering in most conventional communication systems, are preserved by compressing the higher frequency information into the reserved portion of the passband. A transmitted speech signal compressed in this manner preserves consonant information that greatly enhances the intelligibility of the received signal. The invention does so without fundamentally changing the pitch of the transmitted signal. The reserved portion of the passband containing the compressed frequencies can be re-expanded at the receiver to further improve the quality of the received speech signal.

The present invention is especially well-adapted for use in hands-free communication systems such as a hands-free cellular telephone in an automobile. As mentioned in the background, vehicle noise can have a very detrimental effect on speech signals, especially in hands-free systems where the microphone is a significant distance from the speaker's mouth. By preserving more high frequency information, consonants, which are a significant factor in intelligibility, are more easily distinguished, and less likely to be masked by vehicle noise.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1:
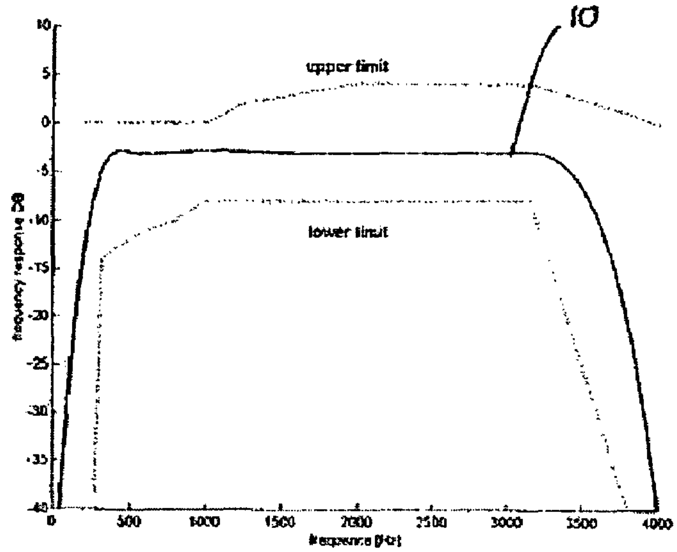
FIG. 1 shows a typical passband for a cellular communications system.
Figure 2:
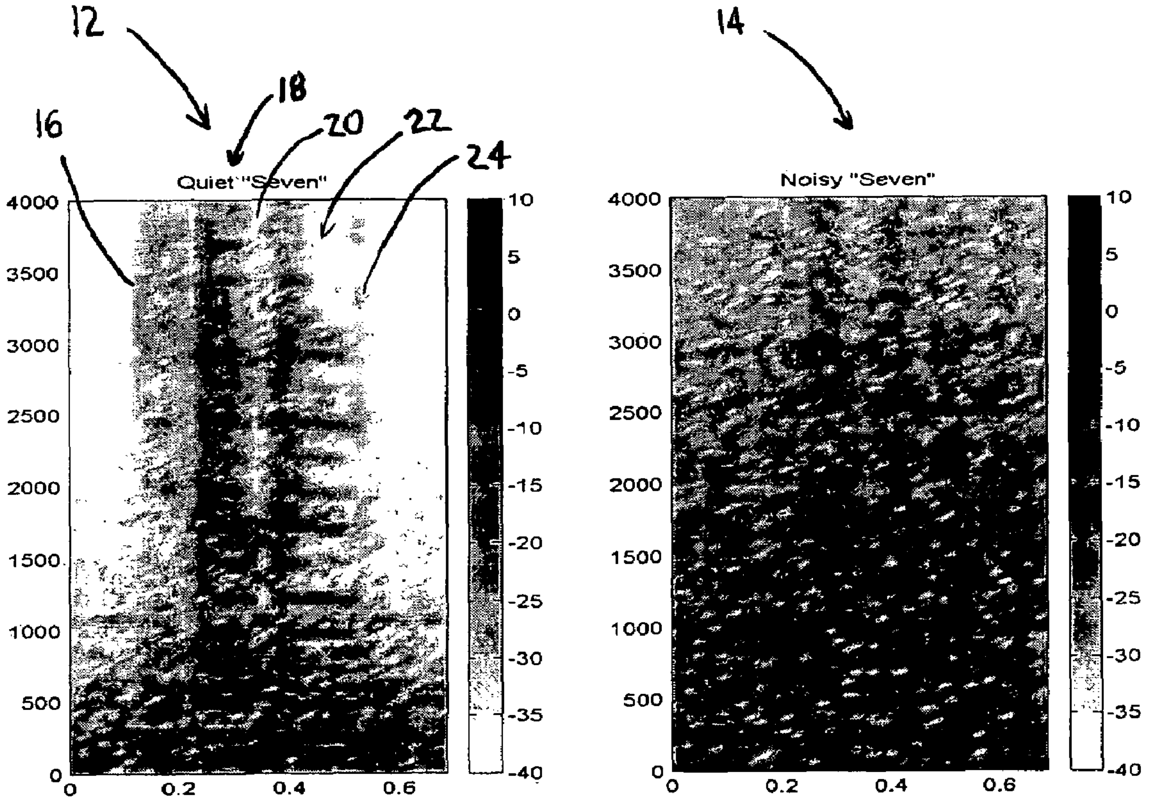
FIG. 2 shows spectrographs of the spoken word "seven" in quiet conditions and noisy conditions.
Figure 3:
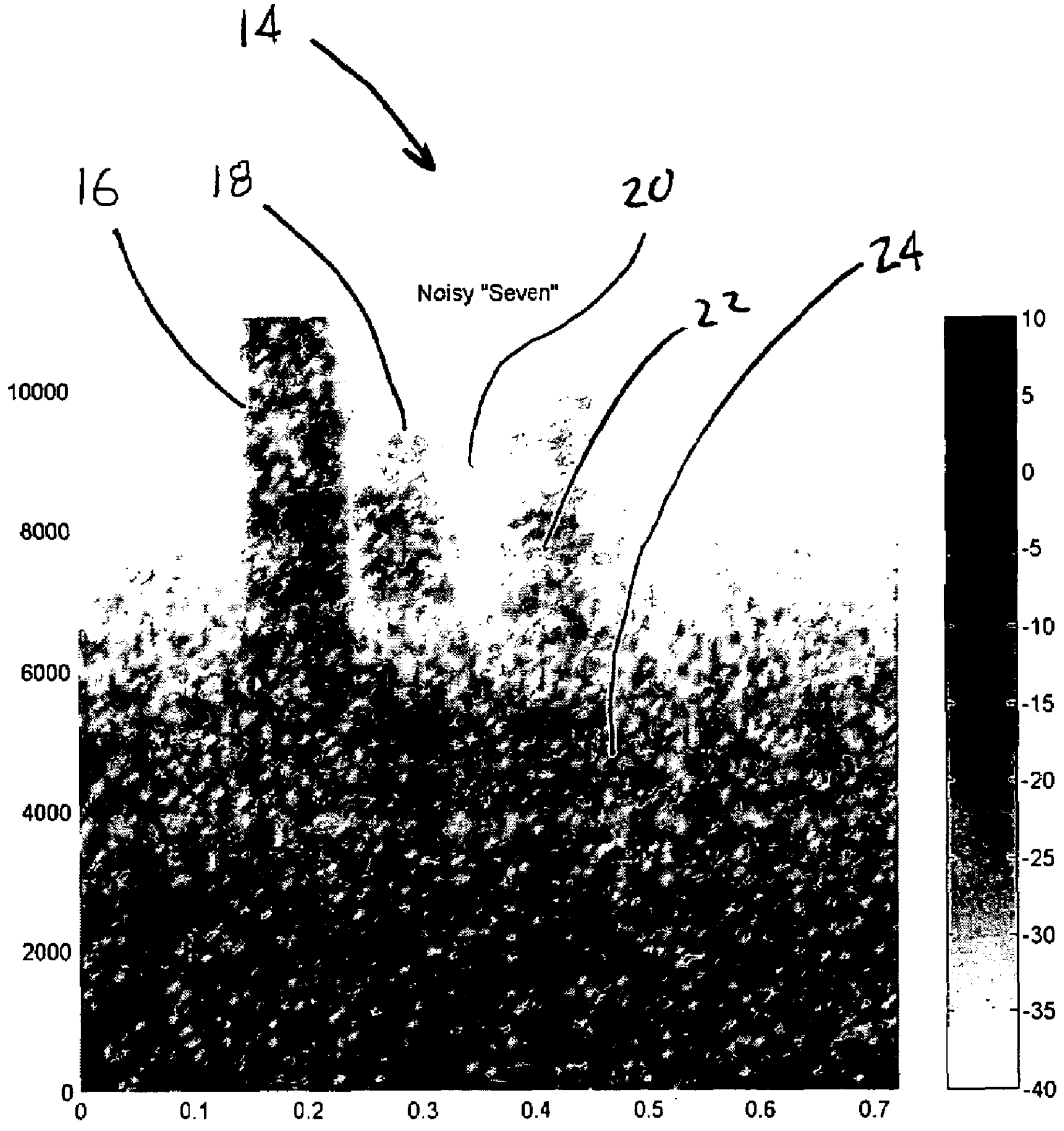
FIG. 3 is a spectrograph of the spoken word seven in noisy conditions showing a wider frequency range than the spectrographs of FIG. 2.
Figure 4:
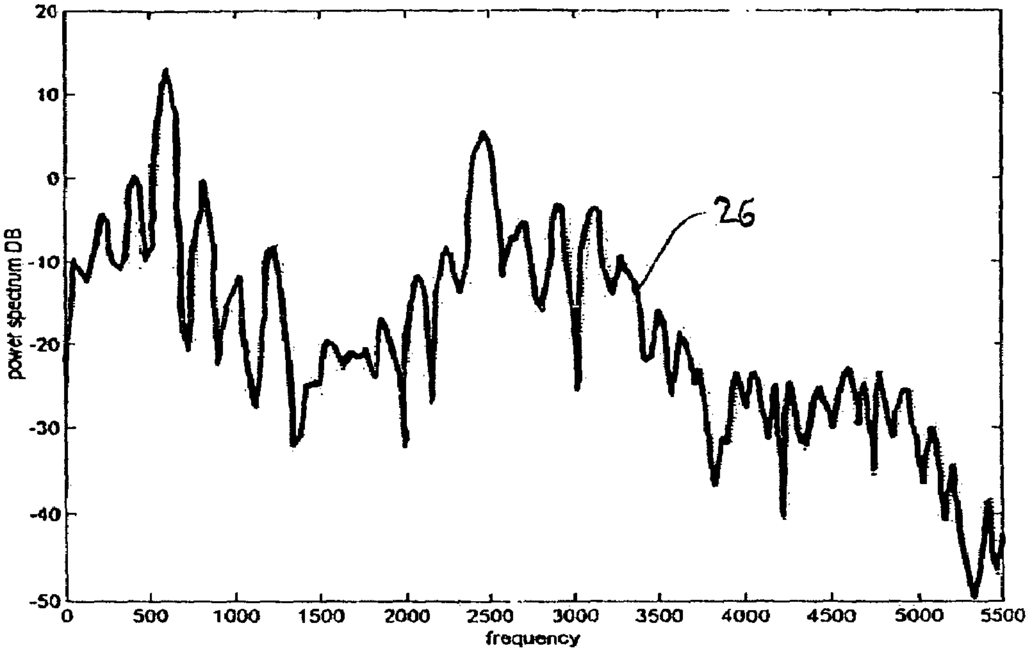
FIG. 4 is the spectrum of an un-compressed 5500 Hz speech signal.
Figure 5:
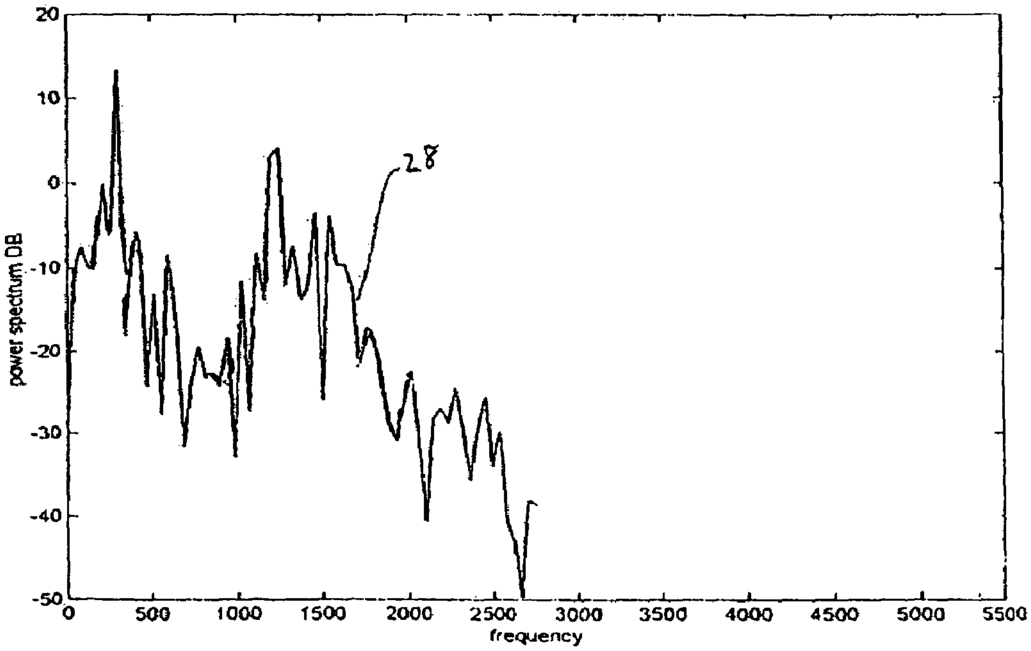
FIG. 5 is the spectrum of the speech signal of FIG. 4 after being subjected to full spectrum linear compression.
Figure 6:
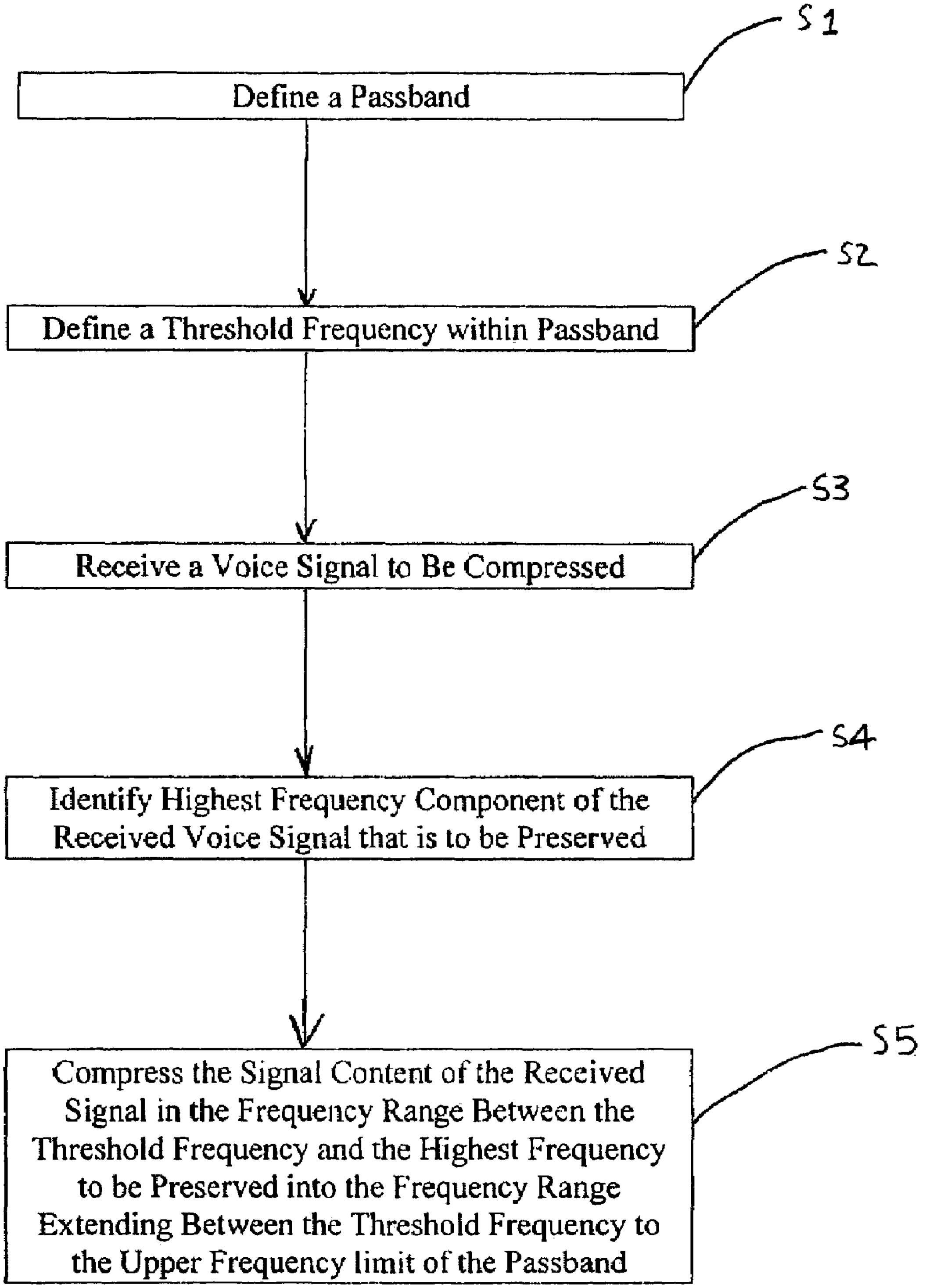
FIG. 6 is a flow chart of a method of performing frequency compression on a speech signal according to the invention.

FIG. 6 shows a flow chart of a method of encoding a speech signal according to the present invention. The first step S1 is to define a passband. The passband defines the upper and lower frequency limits of the speech signal that will actually be transmitted by the communication system. The passband is generally established according to the requirements of the system in which the invention is employed. For example, if the present invention is employed in a cellular communication system, the passband will typically extend from 300 to 3400 Hz. Other systems for which the present invention is equally well adapted may define different passbands.

The second step S2 is to define a threshold frequency within the passband. Components of the speech signal having frequencies below the threshold frequency will not be compressed. Components of a speech signal having frequencies above the frequency threshold will be compressed. Since vowel sounds are mainly responsible for determining pitch, and since the highest frequency formant of a vowel is about 3000 Hz, it is desirable to set the frequency threshold at about 3000 Hz. This will preserve the general tone quality and pitch of the received speech signal. A speech signal is received in step S3. This is the speech signal that will be compressed and transmitted to a remote receiver. The next step S4 is to identify the highest frequency component of the received signal that is to be preserved. All information contained in frequencies above this limit will be lost, whereas the information below this frequency limit will be preserved. The final step S5 of encoding a speech signal according to the invention is to selectively compress the received speech signal. The frequency components of the received speech signal in the frequency range from the threshold frequency to the highest frequency of the received signal to be preserved are compressed into the frequency range extending from the threshold frequency to the upper frequency limit of the passband. The frequencies below the threshold frequency are left unchanged.

Figure 7:
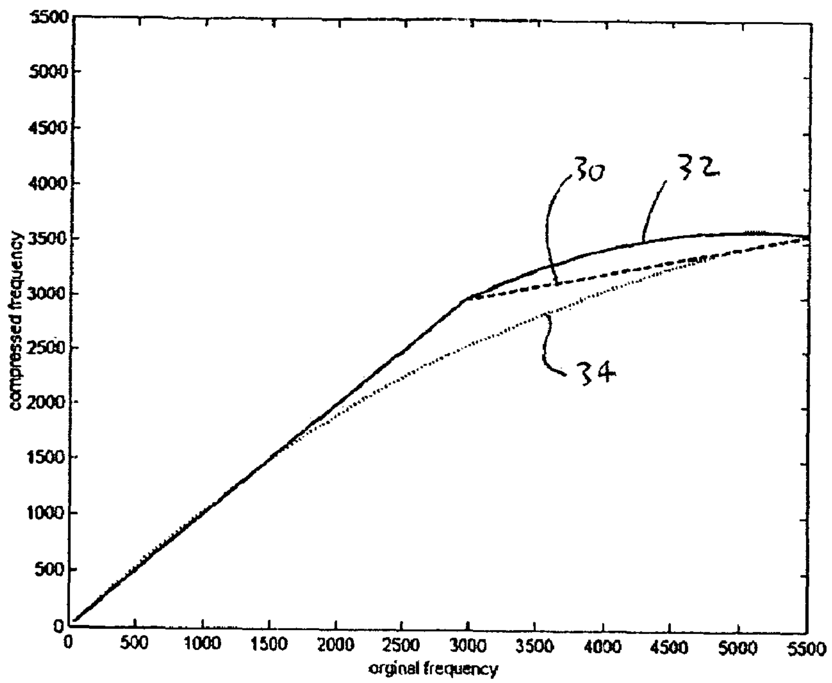
FIG. 7 is a graph of a number of different compression functions for compressing a speech signal according to the invention.

FIG. 7 shows a number of different compression functions for performing the selective compression according to the above-described process. The objective of each compression function is to leave the lower frequencies (i.e. those below the threshold frequency) substantially uncompressed in order to preserve the general tone qualities and pitch of the original signal, while applying aggressive compression to those frequencies above the threshold frequency. Compressing the higher frequencies preserves much high frequency information which is normally lost and improves the intelligibility of the speech signal. The graph in FIG. 7 shows three different compression functions. The horizontal axis of the graph represents frequencies in the uncompressed speech signal, and the vertical axis represents the compressed frequencies to which the frequencies along the horizontal axis are mapped. The first function, shown with a dashed line 30, represents linear compression above threshold and no compression below. The second compression function, represented by the solid line 32, employs non-linear compression above the threshold frequency and none below. Above the threshold frequency, increasingly aggressive compression is applied as the frequency increases. Thus, frequencies much higher than the threshold frequency are compressed to a greater extent than frequencies nearer the threshold. Finally, a third compression function is represented by the dotted line 34. This function applies non-linear compression throughout the entire spectrum of the received speech signal. However, the compression function is selected such that little or no compression occurs at lower frequencies below the threshold frequency, while increasingly aggressive compression is applied at higher frequencies.

Figure 8:
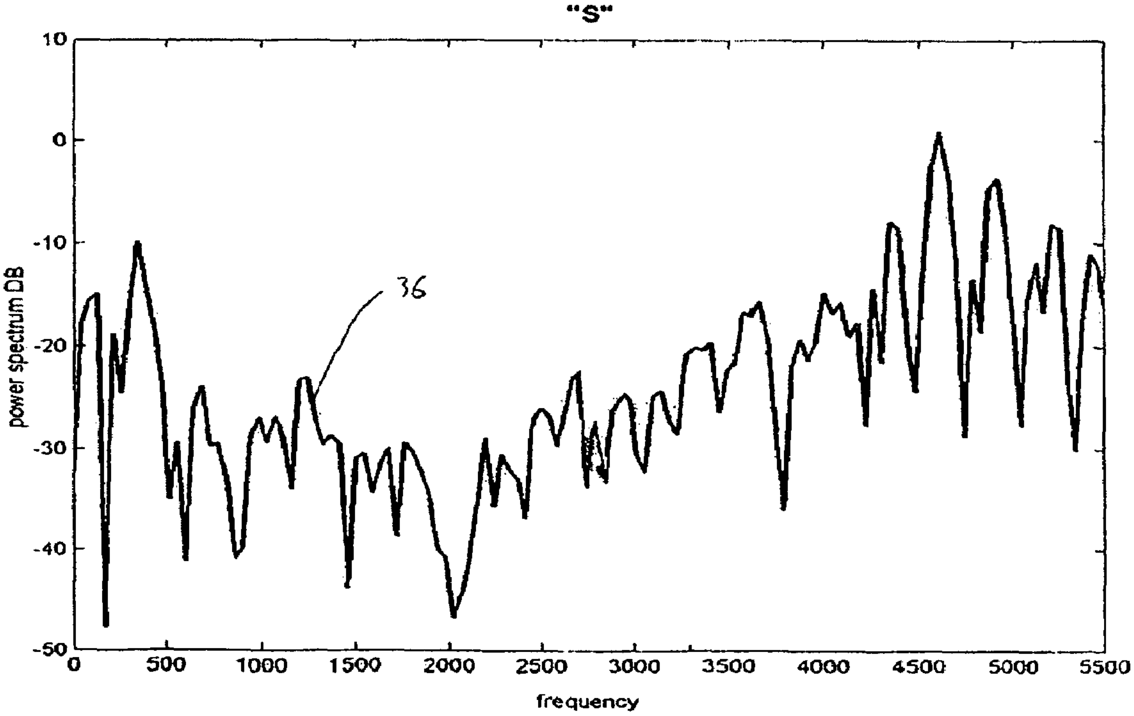
FIG. 8 is a spectrum of an uncompressed speech signal.
Figure 9:
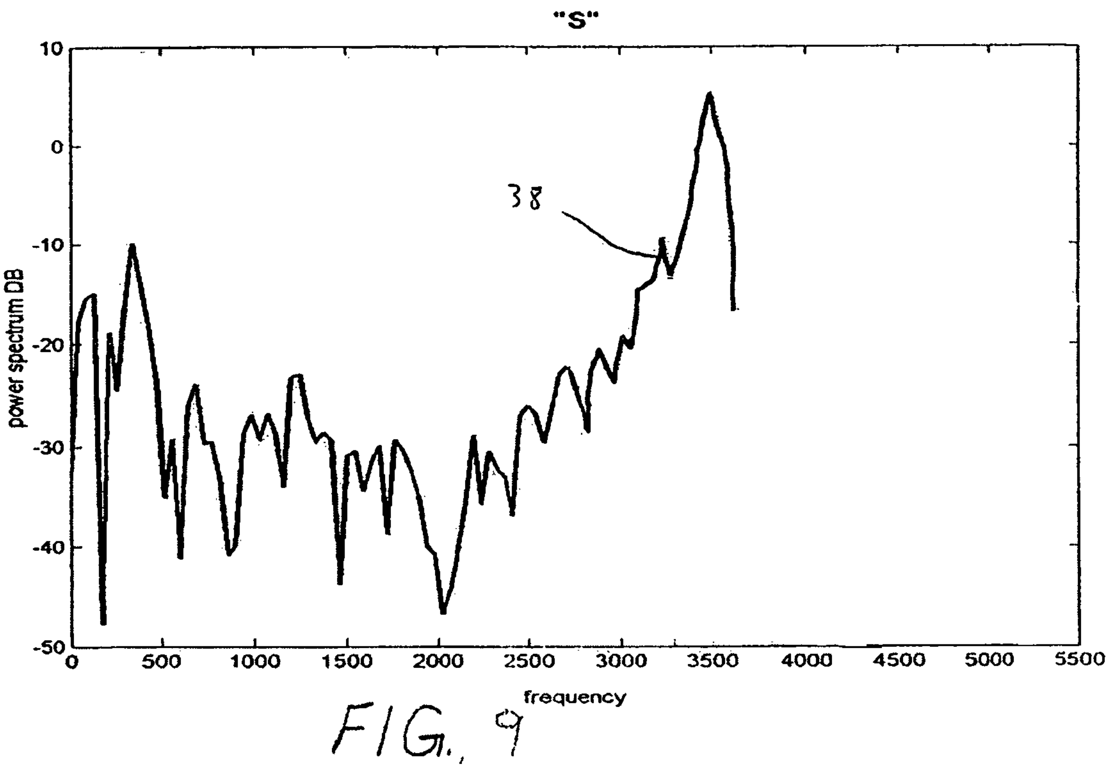
FIG. 9 is a spectrum of the speech signal of FIG. 8 after being compressed according to the invention.

FIG. 8 shows the spectrum of a non-compressed 5500 Hz speech signal 36. FIG. 9 shows the spectrum 38 of the speech signal 36 of FIG. 8 after the signal has been compressed using the linear compression with threshold compression function 30 shown in FIG. 7. Frequencies below the threshold frequency (approximately 3000 Hz) are left unchanged, while frequencies above the threshold frequency are compressed in a linear manner. The two signals in FIGS. 8 and 9 are identical in the frequency range from 0-3000 Hz. However, the portion of the original signal 36 in the frequency range from 3000 Hz to 5500 Hz, is squeezed into the frequency range between 3000 Hz and 3500 Hz in signal 38 of FIG. 9. Thus, the information contained in the higher frequency ranges of the original speech signal 36 of FIG. 8 is retained in the compressed signal 38 of FIG. 9, but has been transposed to lower frequencies. This alters the pitch of the high frequency components, but does not alter tempo. The fundamental pitch characteristics of the compressed signal 38, however, remain the same as the original signal 36, since the lower frequency ranges are left unchanged.

The higher frequency information that is compressed into the 3000-3400 Hz range of the compressed signal 38 is information that for the most part would have been lost to filtering had the original speech signal 36 been transmitted in a typical communications system having a 300-3400 Hz passband. Since higher frequency content generally relates to enunciated consonants, the compressed signal, when reproduced will be more intelligible than would otherwise be the case. Furthermore, the improved intelligibility is achieved without unduly altering the fundamental pitch characteristics of the original speech signal.

These salutary effects are achieved even when the compressed signal is reproduced without subsequent re-expansion. A communication terminal receiving the compressed signal need not be capable of performing an inverse expansion, nor even be aware that a received signal has been compressed, in order to reproduce a speech signal that is more intelligible than one that has not been subjected to any compression. It should be noted, however, that the results are even more satisfactory when a complimentary re-expansion is in fact performed by the receiver.

Figure 10:
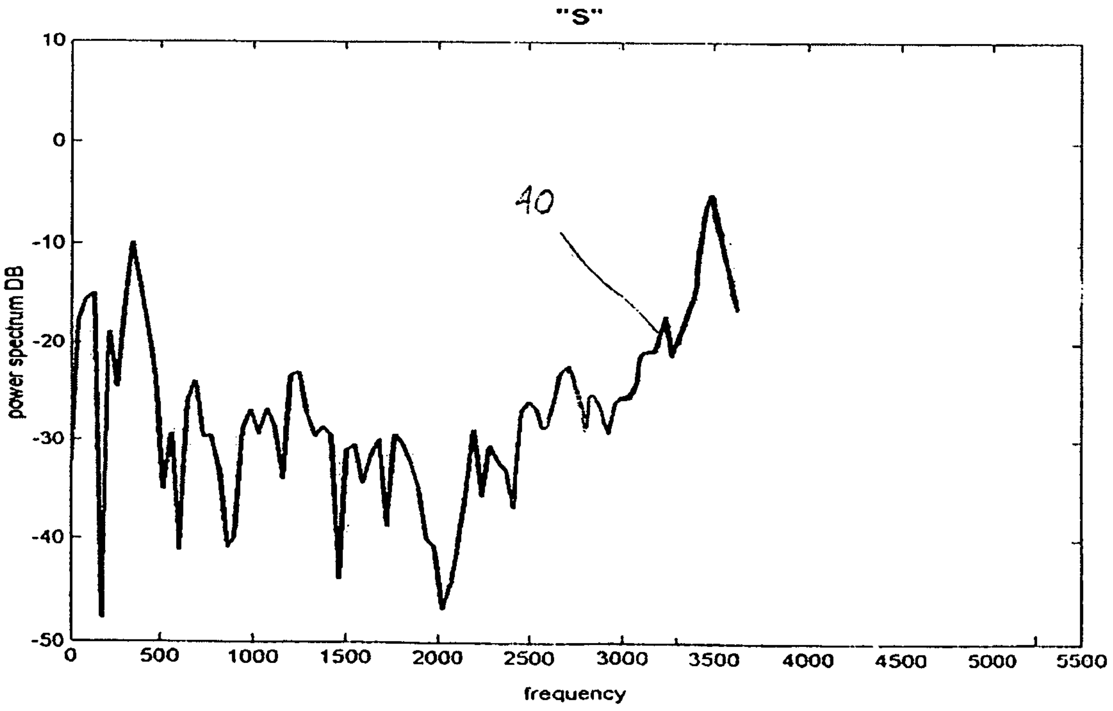
FIG. 10 is a spectrum of the compressed speech signal, which has been normalized to reduce the instantaneous peak power of the compressed speech signal.

Although the improved intelligibility of a transmitted speech signal compressed in the manner described above is achieved without significantly altering the fundamental pitch and tone qualities of the original speech signal, this is not to say that there are no changes to the sound or quality of the compressed signal whatsoever. When the speech signal is compressed the total power of the original signal is preserved. In other words, the total power of the compressed portion of the compressed signal remains equal to the total power of the to-be compressed portion of the original speech signal. Instantaneous peak power, however, is not preserved. Total power is represented by the area under the curves shown in FIGS. 8 and 9. Since the frequency (the horizontal component of the area) of the original speech signal in FIG. 8 is compressed into a much narrower frequency range, the vertical component (or amplitude) of the curve (the peak signal power) must necessarily increase if the area under the curve is to remain the same. The increase in the peak power of the higher frequency components of the compressed speech signal does not affect the fundamental pitch of the speech signal, but it can have a deleterious effect on the overall sound quality of the speech signal. Consonants and high frequency vowel formants may sound sibilant or unnaturally strong when the compressed signal is reproduced without subsequent re-expansion. This effect can be minimized by normalizing the peak power of the compressed signal. Normalization may be implemented by reducing the peak power by an amount proportional to the amount of compression. For example, if the frequency range is compressed by a factor of 2:1, the peak power of the compressed signal is approximately doubled. Accordingly, an appropriate step for normalizing the output power would be to reduce the peak power of the compressed signal by one-half or −3 dB. FIG. 10 shows the compressed speech signal of the FIG. 9 normalized in this manner 40.

Compressing a speech signal in the manner described is alone sufficient to improve intelligibility. However, if a subsequent re-expansion is performed on a compressed signal and the signal is returned to its original non-compressed state, the improvement is even greater. Not only is intelligibility improved, but high frequency characteristics of the original signal are substantially returned to their original pre-compressed state.

Figure 11:
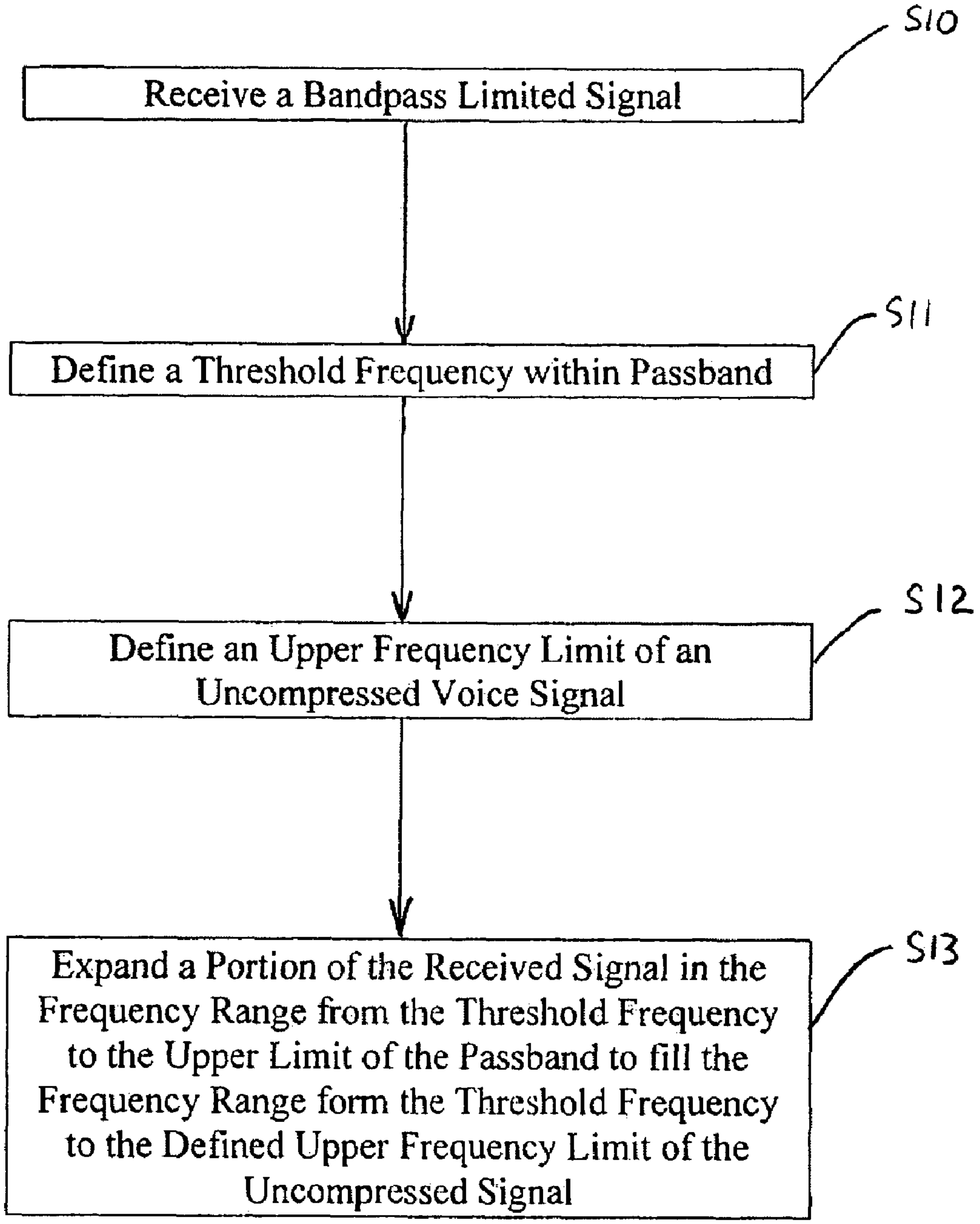
FIG. 11 is a flow chart of a method of performing frequency expansion on a speech signal according to the invention.

Expanding a compressed signal is simply the inverse of the compression procedure already described. A flowchart showing a method of expanding a speech signal according to the invention is shown in FIG. 11. The first step S10 is to receive a bandpass limited signal. The second step S11 is to define a threshold frequency within passband. Preferably, this is the same threshold frequency defined in the compression algorithm. However, since the expansion is being performed at a receiver that may not know whether or not compression applied to the received signal, and if so What threshold frequency was originally established, the threshold frequency selected for the expansion need not necessarily match that selected for compressing the signal if such a threshold existed at all. The next step S12 is to define an upper frequency limit of a decoded speech signal. This limit represents the upper frequency limit of the expanded signal. The final step S13 is to expand the portion of the received signal existing in the frequency range extending from the threshold frequency to the upper limit of the passband to fill the frequency range extending from the threshold frequency to the defined upper frequency limit for the expanded speech signal.

Figure 12:
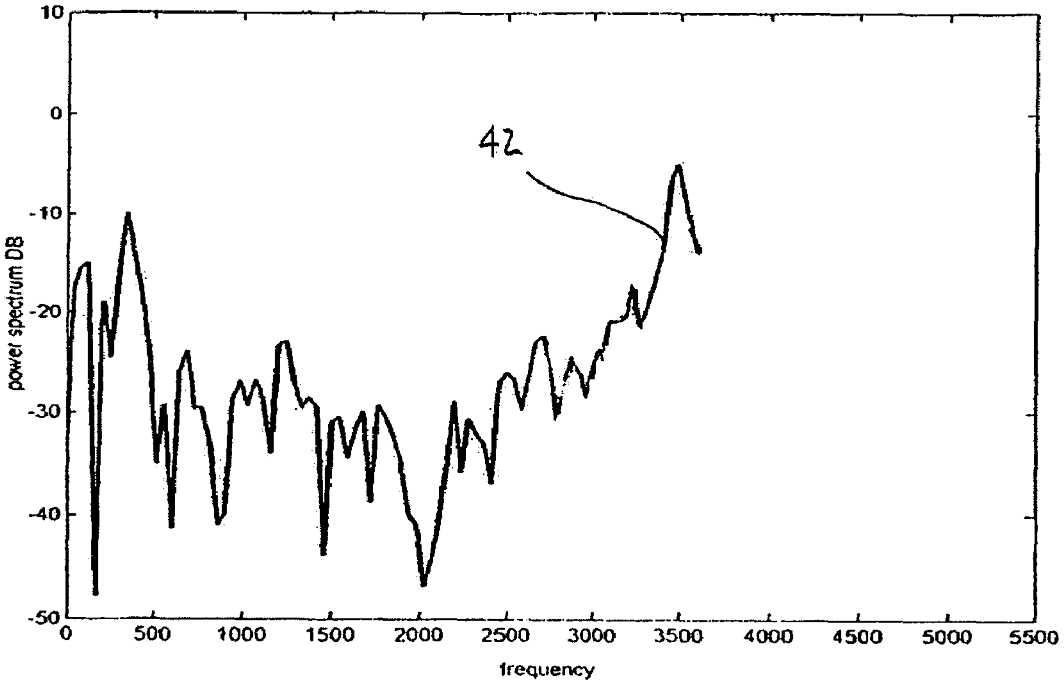
FIG. 12 is a spectrum of a compressed speech signal prior to being expanded according to the invention.
Figure 13:
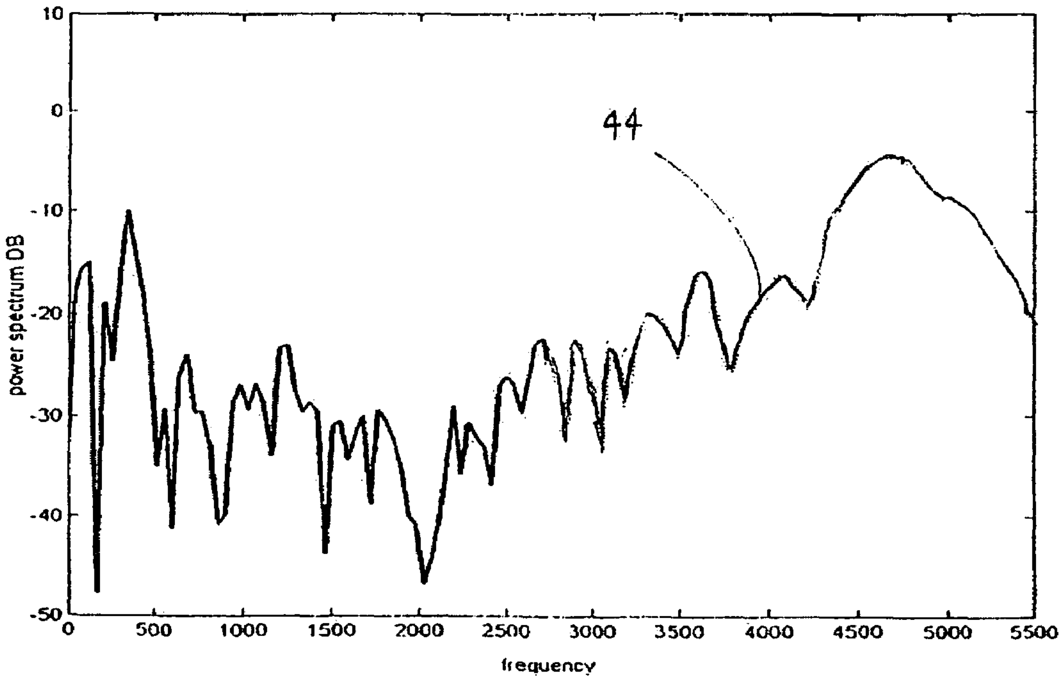
FIG. 13 is a spectrum of a speech signal which has been expanded according to the invention.

FIG. 12 shows the spectrum 42 of a received band pass limited speech signal prior to expansion. FIG. 13 shows the spectrum 44 of the same signal after it has been expanded according to the invention. The portion of the signal in the frequency range from 0-3000 Hz remains substantially unchanged. The portion in the frequency range from 3000-3400 Hz, however, is stretched horizontally to fill the entire frequency range from 3400 Hz to 5500 Hz.

Figure 14:
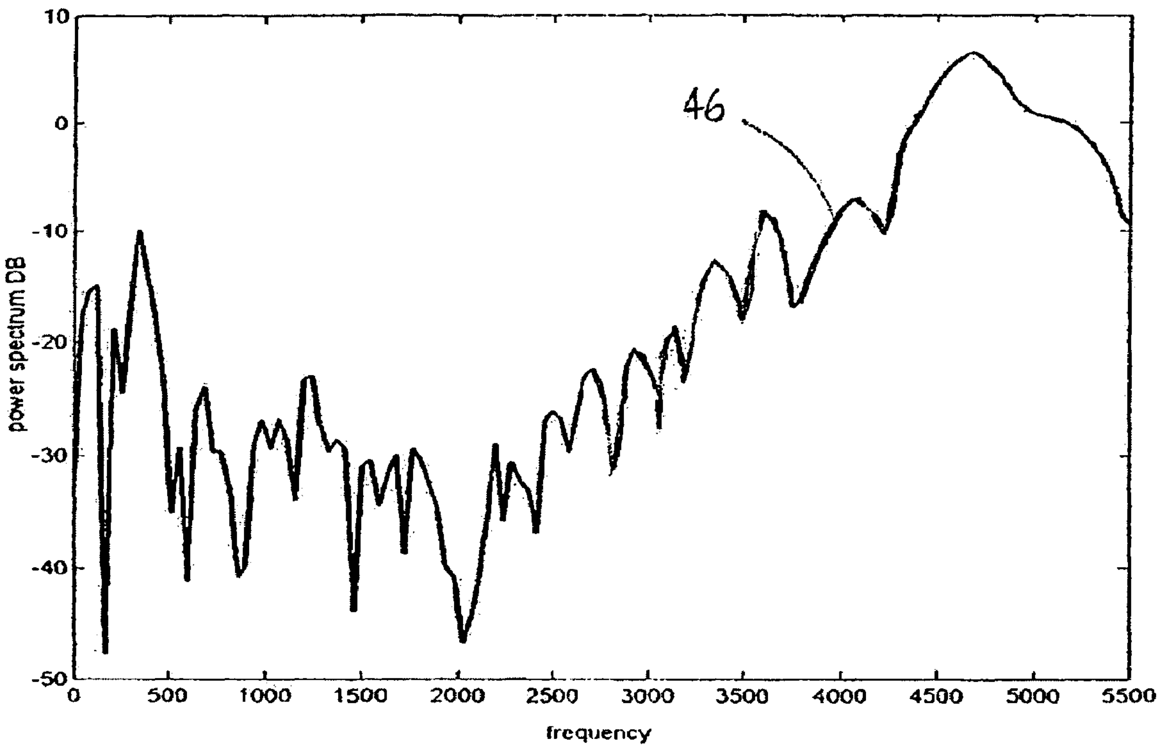
FIG. 14 is a spectrum of the expanded speech signal of FIG. 12 which has been normalized to compensate for the reduction in the peak power of the expanded signal resulting from the expansion.

Like the spectral compression process described above, the act of expanding the received signal has a similar but opposite impact on the peak power of the expanded signal. During expansion the spectrum of the received signal is stretched to fill the expanded frequency range. Again the total power of the received signal is conserved, but the peak power is not. Thus, consonants and high frequency vowel formants will have less energy than they otherwise would. This can be detrimental to the speech quality when the speech signal is reproduced. As with the encoding process, this problem can be remedied by normalizing the expanded signal. FIG. 14 shows the spectrum 46 of an expanded speech signal after it has been normalized. Again the amount of normalization will be dictated by the degree of expansion.

If the speech signal being expanded was compressed and normalized as described above, expanding and normalizing the signal at the receiver will result in roughly the same total and peak power as that in the original signal. Keeping in mind, however, that the expansion technique described above will likely be employed in systems wherein a receiver decoding signal will have no knowledge whether the received signal was encoded and normalized, normalizing an expanded signal may be adding power to frequencies that were not present in the original signal. This could have a greater negative impact on signal quality than the failure to normalize an expanded signal that had in fact been compressed and normalized. Accordingly, in systems where it is not known whether signals received by the decoder have been previously encoded and normalized, it may be more desirable to forego or limit the normalization of the expanded decoded signal.

In any case, the compression and expansion techniques of the invention provide an effective mechanism for improving the intelligibility of speech signals. The techniques have the important advantage that both compression and expansion may be applied independently of the other, without significant adverse effects to the overall sound quality of transmitted speech signals. The compression technique disclosed herein provides significant improvements in intelligibility even without subsequent re-expansion. The methods of encoding and decoding speech signals according to the invention provide significant improvements for speech signal intelligibility in noisy environments and hands-free systems where a microphone picking up the speech signals may be a substantial distance from the speaker's mouth.

Figure 15:
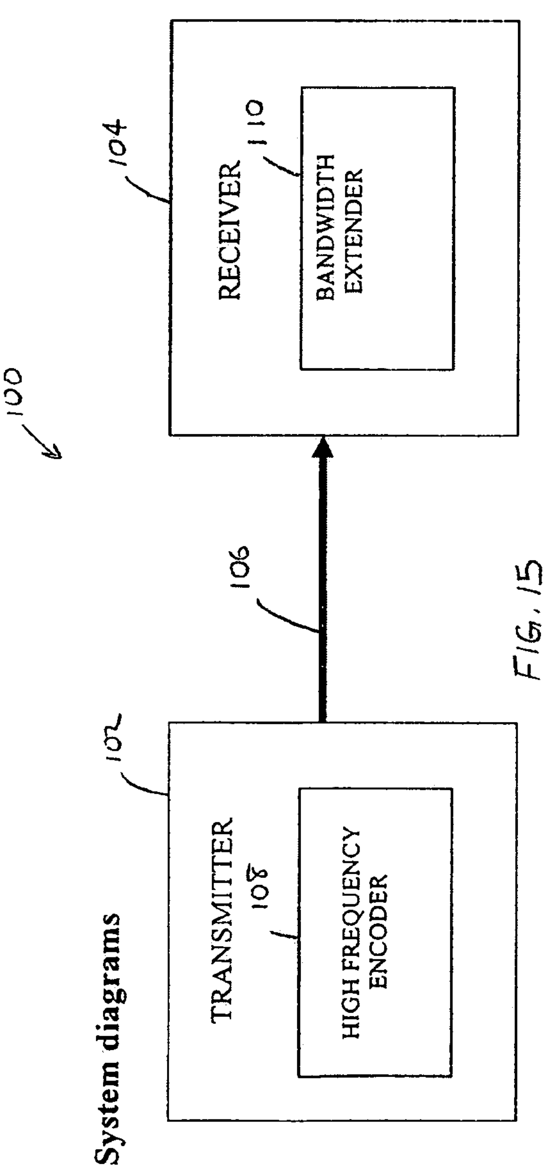
FIG. 15 is a high level block diagram of a communication system employing the present invention.

FIG. 15 shows a high level block diagram of a communication system 100 that implements the signal compression and expansion techniques of the present invention. The communication system 100 includes a transmitter 102; a receiver 104, and a communication channel 106 extending therebetween. The transmitter 102 sends speech signals originating at the transmitter to the receiver 104 over the communication channel 106. The receiver 104 receives the speech signals from the communication channel 106 and reproduces them for the benefit of a user in the vicinity of the receiver 104. In system 100, the transmitter 102 includes a high frequency encoder 108 and the receiver 104 includes a bandwidth extender 110. However, it must be noted, that the present invention may also be employed in communication systems where the transmitter 102 includes a high frequency encoder but the receiver does not include a bandwidth extender, or in systems where the transmitter 102 does not include a high frequency encoder but the receiver nonetheless includes a bandwidth extender 110.

Figure 16:
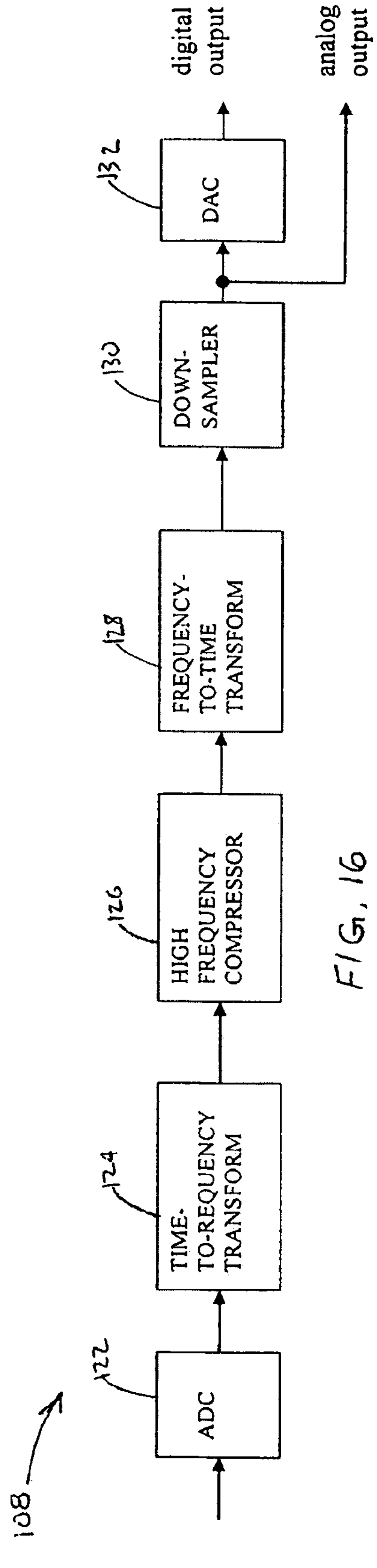
FIG. 16 is a block diagram of the high frequency encoder of FIG. 15.

FIG. 16 shows a more detailed view of the high frequency encoder 108 of FIG. 15. The high frequency encoder includes an A/D converter (ADC) 122, a time-domain-to-frequency-domain transform 124, a high frequency compressor 126; a frequency-domain-to-time-domain transform 128; a down sampler 30; and a D/A converter 132.

The ADC 122 receives an input speech signal that is to be transmitted over the communication channel 106. The ADC 122 converts the analog speech signal to a digital speech signal and outputs the digitized signal to the time-domain-to-frequency-domain transform. The time-domain-to-frequency-domain transform 124 transforms the digitized speech signal from the time-domain into the frequency-domain. The transform from the time-domain to the frequency-domain may be accomplished by a number of different algorithms. For example, the time-domain-to-frequency-domain transform 124 may employ a Fast Fourier Transform (FFT), a Digital Fourier Transform (DFT), a Digital Cosine Transform (DCT); a digital filter bank; wavelet transform; or some other time-domain-to-frequency-domain transform.

Once the speech signal is transformed into the frequency domain, it may be compressed via spectral transposition in the high frequency compressor 126. The high frequency compressor 126 compresses the higher frequency components of the digitized speech signal into a narrow band in the upper frequencies of the passband of the communication channel 106.

Figure 17:
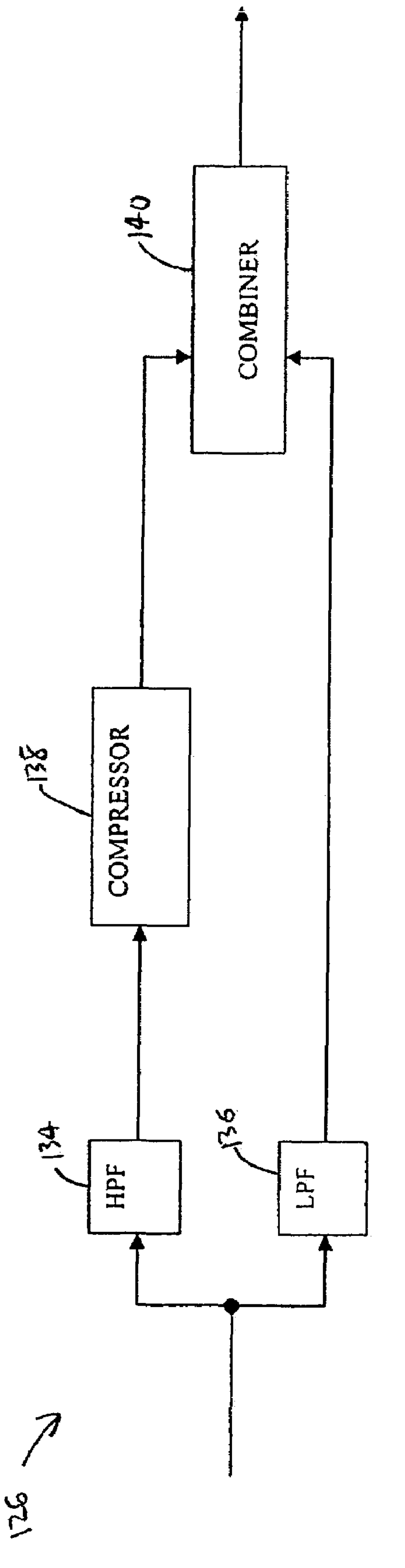
FIG. 17 is a block diagram of the high frequency compressor of FIG. 16.
Figure 18:
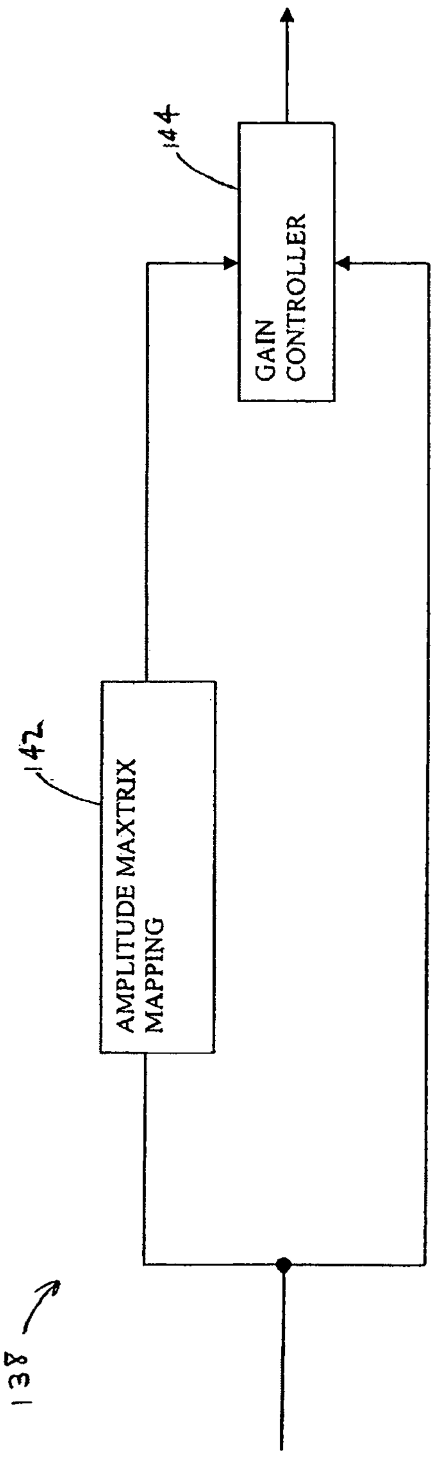
FIG. 18 is a block diagram of the compressor 138 of FIG. 17.

FIGS. 17 and 18 show the high frequency compressor in more detail. Recall from the flowchart of FIG. 6, the originally received speech signal is only partially compressed. Frequencies below a predefined threshold frequency are to be left unchanged, whereas frequencies above the threshold frequency are to be compressed into the frequency band extending from the threshold frequency to the upper frequency limit of the communication channel 106 passband. The high frequency compressor 126 receives the frequency domain speech signal from the time-domain-to-frequency-domain transform 124. The high frequency compressor 126 splits the signal into two paths. The first is input to a high pass filter (HPF) 134, and the second is applied to a low pass filter (LPF) 136. The HPF 134 and LPF 134 essentially separate the speech signal into two components: a high frequency component and a low frequency component. The two components are processed separately according to the two separate signal paths shown in FIG. 17. The HPF 134 and the LPF 136 have cutoff frequencies approximately equal to the threshold frequency established for determining which frequencies will be compressed and which will not. In the upper signal path, the HPF 134 outputs the higher frequency components of the speech signal which are to be compressed. The lower signal path LPF 138 outputs the lower frequency components of the speech signal which are to be left unchanged. Thus, the output from HPF 134 is input to frequency compressor 138. The output of the frequency compressor 138 is input to signal combiner 140. In the lower signal path, the output from the LPF 136 is applied directly to the combiner 140 without compression. Thus, the higher frequencies passed by HPF 134 are compressed and the lower frequencies passed by LPF 136 are left unchanged. The compressed higher frequencies and the uncompressed lower frequencies are combined in combiner 140. The combined signal has the desired attributes of including the lower frequency components of the original speech signal, (those below the threshold frequency) substantially unchanged, and the upper frequency components of the original speech signal (those above the threshold frequency) compressed into a narrow frequency range that is within the passband of the communication channel 106.

FIG. 18 shows the compressor 138 itself. The higher frequency components of the speech signal output from the HPF 134 are again split into two signal paths when they reach the compressor 138. The first signal path is applied to a frequency mapping matrix 142. The second signal path is applied directly to a gain controller 144. The frequency mapping matrix maps frequency bins in the uncompressed signal domain to frequency bins in the compressed signal range. The output from the frequency mapping matrix 142 is also applied to the gain controller 144. The gain controller 144 is an adaptive controller that shapes the output of the frequency mapping matrix 142 based on the spectral shape of the original signal supplied by the second signal path. The gain controller helps to maintain the spectral shape or "tilt" of the original signal after it has been compressed. The output of the gain controller 144 is input to the combiner 140 of FIG. 17. The output of the combiner 140 comprises the actual output of the high frequency compressor 126 (FIG. 16) and is input to the frequency-domain to time-domain transform 128 as shown in FIG. 16.

The frequency-domain-to-time-domain transform 128 transforms the compressed speech signal back into the time-domain. The transform from the frequency-domain back to the time-domain may be the inverse transform of the time-domain-to-frequency-domain transform performed by the time-domain to frequency domain transform 124, but it need not necessarily be so. Substantially any transform from the frequency-domain to the time-domain will suffice.

Next, the down sampler 130 samples the time-domain digital speech signal output from the frequency-domain to time-domain transform 128. The downsampler 130 samples the signal at a sample rate consistent with the highest frequency component of the compressed signal. For example if the highest frequency of the compressed signal is 4000 Hz the down sampler will sample the compressed signal at a rate of at least 8000 Hz. The down sampled signal is then applied to the digital-to-analog converter (DAC) 132 which outputs the compressed analog speech signal. The DAC 132 output may be transmitted over the communication channel 106. Because of the compression applied to the speech signal the higher frequencies of the original speech signal will not be lost due to the limited bandwidth of the communication channel 106. Alternatively, the digital to analog conversion may be omitted and the compressed digital speech signal may be input directly to another system such as an automatic speech recognition system.

Figure 19:
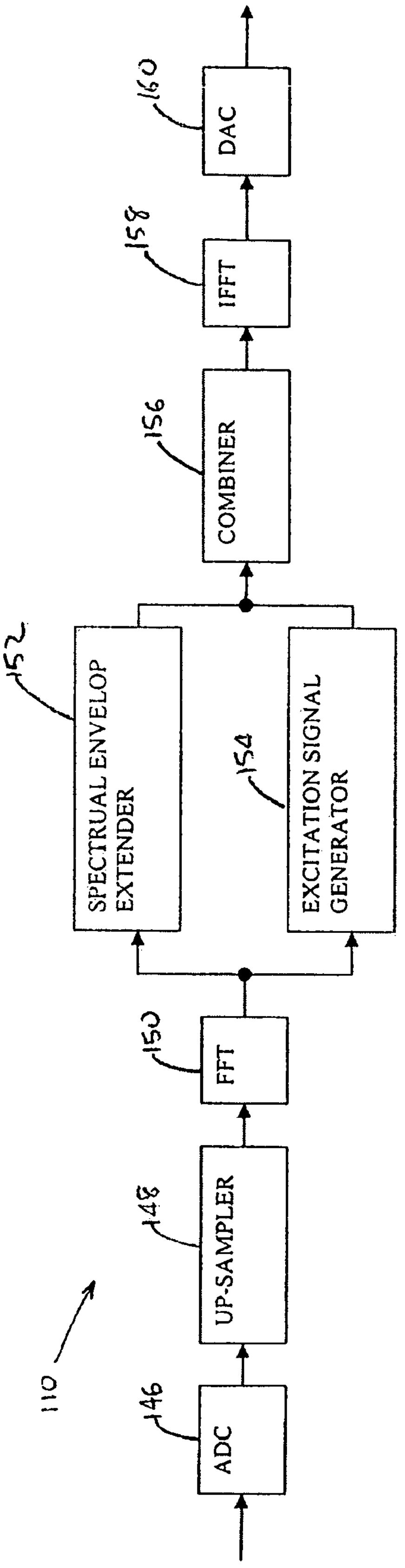
FIG. 19 is a block diagram of the bandwidth extender of FIG. 15.

FIG. 19 shows a more detailed view of the bandwidth extender 110 of FIG. 15. Recall from the flow chart of FIG. 11, the purpose of the bandwidth extender is to partially expand received band limited speech signals received over the communication channel 106. The bandwidth extender is to expand only the frequency components of the received speech signals above a pre-defined frequency threshold. The bandwidth extender 110 includes an analog to digital converter (ADC) 146; an up sampler 148; a time-domain-to-frequency-domain transformer 150, a spectral envelope extender 152; an excitation signal generator 154; a combiner 156; a frequency-domain-to-time-domain transformer 158; and a digital to analog converter (DAC) 160.

The ADC 146 receives a band limited analog speech signal from the communication channel 106 and converts it to a digital signal. Up sampler 148 then samples the digitized speech signal at a sample rate corresponding to the highest rate of the intended highest frequency of the expanded signal. The Up sampled signal is then transformed from the time-domain to the frequency domain by the time-domain-to-frequency-domain transform 150. As with the high frequency encoder 108, this transform may be a Fast Fourier Transform (FFT), a Digital Fourier Transform (DFT), a Digital Cosine Transform; a digital filter bank; wavelet transform, or the like. The frequency domain signal is then split into two separate paths. The first is input to a spectral envelop extender 152 and the second is applied to an excitation signal generator 154.

Figure 20:
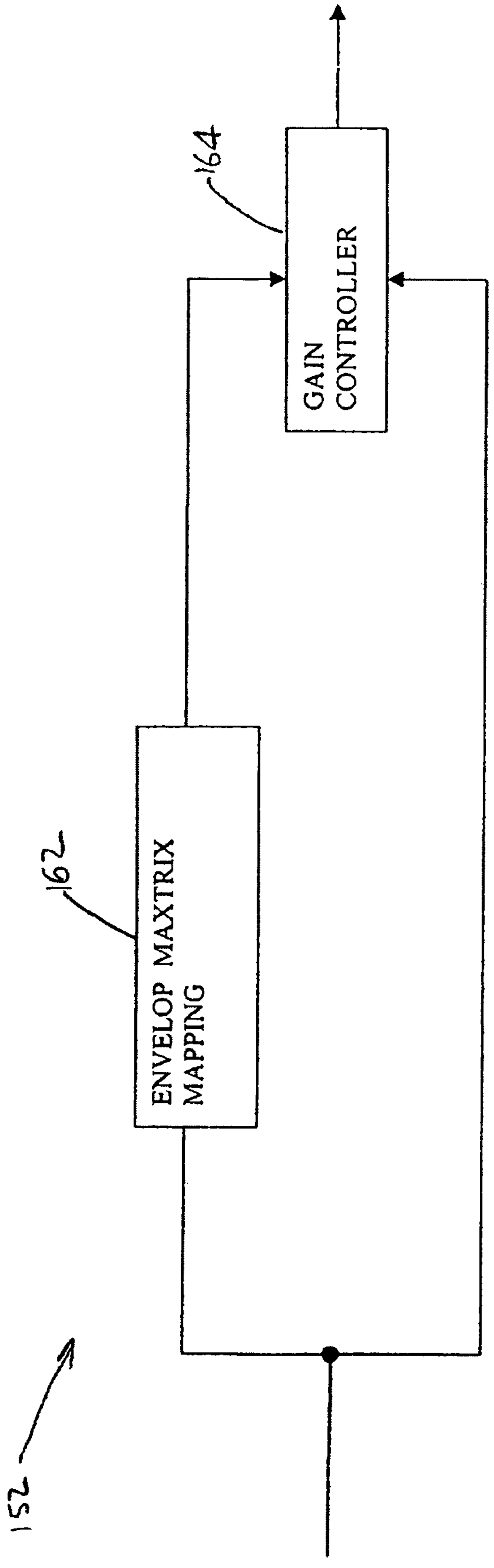
FIG. 20 is a block diagram of the spectral envelope extender of FIG. 19.

The spectral envelope extender is shown in more detail in FIG. 20. The input to the envelope extender 142 is applied to both an frequency demapping matrix 162 and a gain controller 164. The frequency demapping matrix 162 maps the lower frequency bins of the received compressed speech signal to the higher frequency bins of the extended frequencies of the uncompressed signal. The output of the frequency demapping matrix 162 is an expanded spectrum of the speech signal having a highest frequency component corresponding to the desired highest frequency output of the bandwidth extender 110. The spectrum of the signal output from the frequency demapping matrix is then shaped by the gain controller 164 based on the spectral shape of the spectrum of the original un-expanded signal which, as mentioned, is also input to the gain controller 164. The output of the gain controller 164 forms the output of the spectral envelope extender 162.

A problem that arises when expanding the spectrum of a speech signal in the manner just described is that harmonic and phase information is lost. The excitation signal generator creates harmonic information based on the original un-expanded signal. Combiner 156 combines the spectrally expanded speech signal output from the spectral envelope extender 152 with output of the excitation signal generator 154. The combiner uses the output of the excitation signal generator to shape the expanded signal to add the proper harmonics and correct their phase relationships. The output of the combiner 156 is then transformed back into the time domain by the frequency-domain-to-time-domain transform 158. The frequency-domain-to-time-domain transform may employ the inverse of the time-domain to frequency domain transform 150, or may employ some other transform. Once back in the time-domain the expanded speech signal is converted back into an analog signal by DAC 160. The analog signal may then be reproduced by a loud speaker for the benefit of the receiver's user.

By employing the speech signal compression and expansion techniques described in the flow charts of FIGS. 6 and 11, the communication system 100 provides for the transmission of speech signals that are more intelligible and have better quality than those transmitted in traditional band limited systems. The communication system 100 preserves high frequency speech information that is typically lost due to the passband limitations of the communication channel. Furthermore, the communication system 100 preserves the high frequency information in a manner such that intelligibility is improved whether or not a compressed signal is re-expanded when it is received. Signals may also be expanded without significant detriment to sound quality whether or nor they had been compressed before transmission. Thus, a transmitter 102 that includes a high frequency encoder can transmit compressed signals to receivers which unlike receiver 104, do not include a bandwidth expander. Similarly, a receiver 104 may receive and expand signals received from transmitters which, unlike transmitter 102, do not include a high frequency encoder. In all cases, the intelligibility of transmitted speech signals is improved. It should be noted that various changes and modifications to the present invention may be made by those of ordinary skill in the art without departing from the spirit and scope of the present invention which is set out in more particular detail in the appended claims. Furthermore, those of ordinary skill in the art will appreciate that the foregoing description is by way of example only, and is not intended to be limiting of the invention as described in such appended claims.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method of improving intelligibility of a speech signal comprising:

identifying a frequency passband having a passband lower frequency limit and a passband upper frequency limit;

defining a threshold frequency within the frequency passband that generally preserves a tone quality and pitch of a received speech signal;

receiving the speech signal, the speech signal having a frequency spectrum, a highest frequency component of which is greater than the passband upper frequency limit;

compressing a portion of the speech signal frequency spectrum in a first frequency range between the threshold frequency and the highest frequency component of the speech signal into a frequency range between the threshold frequency and the passband upper frequency limit; and normalizing a peak power of the compressed portion of the speech signal by an amount that is based on an amount of compression in the frequency range between the threshold frequency and the passband upper frequency limit, where the act of normalizing comprises reducing the peak power by an amount proportional to an amount of compression in the frequency range between the threshold frequency and the passband upper frequency limit.

2. The method of improving the intelligibility of a speech signal of claim 1 further comprising:

transmitting the compressed speech signal;

receiving the compressed speech signal; and audibly reproducing the compressed speech signal.

3. The method of improving intelligibility of a speech signal of claim 1 further comprising:

transmitting the compressed speech signal;

receiving the compressed speech signal; and expanding the received compressed speech signal.

4. The method of improving intelligibility of a speech signal of claim 1 further comprising:

transmitting the compressed normalized speech signal;

receiving the compressed normalized speech signal; and expanding the received compressed normalized speech signal.

5. The method of improving intelligibility of a speech signal of claim 4 further comprising re-normalizing the expanded received compressed normalized speech signal, and audibly reproducing the re-normalized expanded speech signal.

6. The method of improving intelligibility of a speech signal of claim 4 further comprising audibly reproducing the expanded received compressed normalized speech signal.

7. The method of improving intelligibility of a speech signal of claim 1 where compressing a portion of the speech signal frequency spectrum comprises applying linear frequency compression above the threshold frequency.

8. The method of improving intelligibility of a speech signal of claim 1 where compressing a portion of the speech signal frequency spectrum comprises applying non-linear frequency compression above the threshold frequency.

9. The method of improving intelligibility of a speech signal of claim 1 where compressing a portion of the speech signal frequency spectrum comprises applying non-linear frequency compression throughout the spectrum of the speech signal where a compression function employed for performing the compression is selected such that minimal compression is applied in lower frequency and increasing compression is applied in higher frequency.

10. The method of improving intelligibility of a speech signal of claim 1 where the act of defining the threshold frequency comprises selecting the threshold frequency to be about 3000 Hz.

11. A high frequency encoder comprising:

an A/D converter for converting an analog speech signal to a digital time-domain speech signal;

a time-domain-to-frequency-domain transform for transforming the time-domain speech signal to a frequency-domain speech signal;

a high frequency compressor for spectrally transposing high frequency components of the frequency-domain speech signal to lower frequencies for a compressed frequency-domain speech signal;

a frequency-domain-to-time-domain transform for transforming the compressed frequency-domain speech signal into a compressed time-domain speech signal; and a down sampler for sampling the compressed time-domain signal at a sample rate appropriate for a highest frequency of the compressed time-domain speech signal;

where a peak power of the compressed frequency-domain speech signal or the compressed time-domain speech signal is normalized based on an amount of compression in the compressed frequency-domain speech signal, where the peak power of the compressed frequency-domain speech signal or the compressed time-domain speech signal is reduced by an amount proportional to an amount of compression in the high frequency components of the frequency-domain speech signal that were moved to lower frequencies.

12. The high frequency encoder of claim 11 where the high frequency compressor comprises a highpass filter for extracting high frequency components of the frequency-domain speech signal and a frequency mapping matrix for mapping the high frequency components of the frequency-domain speech signal to lower frequencies, to which the high frequency components are spectrally transposed.

13. The high frequency encoder of claim 11 where the high frequency compressor further comprises a low pass filter for extracting low frequency components of the frequency-domain speech signal, and a combiner for combining the extracted low frequency components of the frequency-domain speech signal with the high frequency components of the frequency-domain speech signal spectrally transposed to lower frequencies.

* * * * *

UNITED STATES PATENT AND TRADEMARK OFFICE

CERTIFICATE OF CORRECTION

PATENT NO. : 7,813,931 B2
APPLICATION NO. : 11/110556
DATED : October 12, 2010
INVENTOR(S) : Phillip Hetherington et al.

It is certified that error appears in the above-identified patent and that said Letters Patent is hereby corrected as shown below:

In the Claims

In column 12, claim 11, line 58, after "amount of compression in" delete "the".

Signed and Sealed this
Fourth Day of January, 2011

David J. Kappos
*Director of the United States Patent and Trademark Office*